United States Patent Office 3,652,511
Patented Mar. 28, 1972

3,652,511
WATER-DISPERSIBLE POLYIMIDE COATINGS
Gerald G. Vincent, Barrington, and Thomas E. Anderson, Palatine, Ill., assignors to De Soto, Inc., Des Plaines, Ill.
No Drawing. Filed Apr. 28, 1969, Ser. No. 820,017
Int. Cl. C08g 20/20
U.S. Cl. 260—78 UA                                    10 Claims

ABSTRACT OF THE DISCLOSURE

Water dispersible polyimide coatings are formed by reacting an unsaturated anhydride such as maleic anhydried with a diprimary amine such as polyoxypropylene diamine, and the bis-imide so provided is then reacted with further diprimary amine to produce a resinous polyimide polymer having secondary amino-hydrogen atoms which enable reaction with a polycarboxylic acid monoanhydride, such as maleic anhhydride, to produce an acidic derivative which can be dispersed in water with the aid of a base. The water-dispersed resin can be electrodeposited at the anode with a unidirectional electrical current. If desired, a sulfhydryl-terminated low molecular weight elastomer may be incorporated into the polyimide utilizing the unsaturation of the polymer for this purpose.

---

The present invention relates to polyimide resins which are dispersible in water with the aid of a base and which can be electrodeposited at the anode of a unidirectional electrical system. The invention is particularly directed to the electrodeposition of coatings which are solvent resistant, which are strongly adherent to an underlying metal substrate, and which possess good flexibility.

Polyimide resins are a class of materials which are generally insoluble in virtually all solvents. These types of resins are usually prepared by reacting a diamine such as diamino diphenyl ether and a dianhydride such as pyromellitic dianhydride. Although these polymers are generally used for high temperature applications, they also exhibit outstanding resistance to the majority of chemicals and solvent with which they come in contact.

We have found that polyimide resins prepared from an unsaturated polycarboxylic monoanhydride and a diamine can be further modified with a polycarboxylic acid anhydrides to form a polymer which is dispersible in water with the aid of a base and is capable of migration under the influence of an electrical potential.

In the invention, an unsataurated polycarboxylic monoanhydride, and especially maleic anhydride, is reacted with a diamine to provide a doubly unsaturated bis-maleimide intermediate having the general formula:

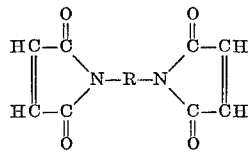

and this bis-maleimide is reacted with additional diamine to provide a polymer in which amine groups link together the maleimide units, the reaction consuming the maleimide unsaturation to produce:

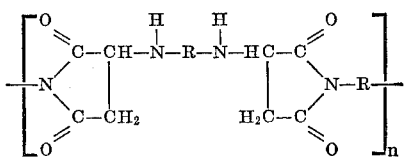

which represents a resinous polymer containing amine and imide linkages in which R identifies the divalent organic radical on which the original diamine was based. Of course, the diamine used to form the maleimide intermediate need not be the same as that used to resinify the intermediate via amine formation.

It will be observed that to the formula presented above, the polymer includes a plurality of secondary amino hydrogen atoms.

This type of polyimide is soluble in polar organic solvents such as dimethyl formamide, dimethylacetamide, N-methyl pyrrolidone, butyrolactone, etc., whereas polyimides made with pyromellitic dianhydride and diaminodiphenyl ether are not. Diluents may be used to extend the solvent such as cyclohexanone which may also be regarded to be a solvent since it will dissolve the resin after extensive agitation.

Any bis-maleimide may be used since it is the terminal maleic unsaturation which is relied upon for reaction with a di-primary amine to provide polymer growth. The di-imide internal structure of the bis-maleimide is entirely inert.

Any alpha, beta-monoethylenically unsaturated polycarboxylic monoanhydride can be used to prepare the bismaleimide, maleic anhydride being typical. Other anhydrides which may be used are citraconic anhydride, itaconic anhydride and the like.

Broadly, any diprimary amine, either aliphatic or aromatic, may be used to provide the original bis-maleimide and to later provide the polymeric amineimide. Obviously, the diprimary amine is preferably free of reactive groups other than amine groups, though it is difficult to conceive of an available diprimary amine which would include an interfering reactive group. Illustrative aliphatic and aromatic diprimary amines are noted hereinafter.

On the other hand, it is particularly preferred that the diprimary amine which is used to form the bis-maleimide include the oxyalkylene group. Diamines of this type are particularly illustrated by polyoxypropylene diamine having a molecular weight of about 200, although higher molecular weight variations can be used. Also, the oxyethylene or oxybutylene group may be used in place of the oxypropylene group with corresponding results.

The preferred amines for polymer formation will vary depending upon the result sought. Thus, aromatic amines provide the best properties and can be used for such purpose. Particularly useful aromatic diamines are as follows: diamino-diphenyl ether, diamino diphenyl sulfone, piperazine, 4,4' diamino diphenyl methane, p-phenylene diamine, and 2,4 diamino-6-phenyl-s-triazine (benzoguanamine). The use of diamines such as piperazine, diamino-diphenyl sulfone or diamino-diphenyl ether requires careful cooking procedures to avoid gelled products, but these compounds can be used.

Aliphatic diamines are particularly suitable when it is desired to employ minimum curing temperatures, e.g., 250° F. as opposed to higher temperatures illustrated by 350–400° F. The aliphatic diamines are illustrated by hexamethylene diamine, propane diamine and 1,4-bis-(amino methyl) cyclohexane.

A typical reaction in the invention would proceed by dissolving the bis-maleimide in dimethyl acetamide to provide at room temperature a 20% by weight solution. The selected diamine is then added to provide a 1:1 molar ratio and the mixture is heated to 150° C. whereupon a reaction takes place and the viscosity builds. The reaction is stopped prior to gelation when a desired viscosity is reached which is normally obtained by simply maintaining the 150° temperature for 60–90 minutes. So long as the reaction is stopped before gelation, the flexibility and chemical resistance of the product improve with increasing resinification (higher viscosity).

The formation of the bis-maleimide will not be discussed at length since these are known compounds. On the other hand, the selection of polyoxyalkylene diamines significantly improves water dispersibility in accordance with the invention and the production of bis-maleimides based on these diamines will be illustrated in the accompanying examples.

Referring more particularly to the polymerization reaction of the bis-maleimide and further diamine, this reaction commences at a temperature of about 130° C. and increases in speed with increasing temperature. Preferred conditions are from 145–160° C., but higher temperatures can be used with increasing control difficulties as the reaction becomes quite rapid. Of course, it is convenient to use a reflux temperature determined by the solvents selected, but pressure can be used to conduct the desired liquid phase reaction at temperatures above the normal boiling point of the solvents selected.

The reaction must be carried out in organic solvent solution. The same reactants are reactive in the absence of solvent, but the bulk reaction proceeds rapidly at relatively low temperature and produces a solvent insoluble product useless in the invention.

The relative molar proportions of bis-maleimide and diamine can vary widely from 5:1 to 1:5, but the higher molecular weight products are preferred, and these are obtained using a molar ratio in the range of 1.5:1 to 1:1.5.

The resin solutions which have been made in the manner described above are more fully set forth in our prior United States application, Ser. No. 747,799, filed July 26, 1968, and which points out that the baked films which can be produced are hard and flexible and solvent resistant. On the other hand, these resins, while soluble in strong solvents, are non-soluble in ordinary solvents and in water.

It is desired to point out that polymer formation is achieved through the reaction of the primary amine group with terminal maleic unsaturation in the bis-maleimide so that, and particularly where the bis-maleimide is present in molar excess, terminal maleic unsaturation remains and can be reacted to extend the polymer chain or to terminate the polymer chain as desired. Thus, a small proportion of ethyl amine may be added as a chain terminator. Correspondingly, acrylonitrile can be added for the same purpose. Still further, the sulfhydryl group can react with the maleic unsaturation in the same way and this reaction can be relied upon to introduce low molecular weight sulfhydryl-terminated linear polymers into the polymer molecule. It is a feature of the invention to find that such polymers, and especially low molecular elastomers, can be incorporated without destroying water dispersibility or interfering with the electrodeposition process. It will be recognized, of course, that the sulfhydryl-terminated polymer can be introduced either as a mono- or di-sulfhydryl-terminated product to either terminate the chain or extend the chain as desired.

It should still further be noted that the acidity desired for solubilization in aqueous alkaline medium may be introduced utilizing maleic anhydride, in which event, the sulfhydryl-terminated elastomer can be coupled to the maleic unsaturation in the acidic side chain.

In accordance with the present invention, the resins produced as described hereinbefore and which include secondary amino hydrogen atoms are reacted with a small proportion of a polycarboxylic acid monoanhydride, preferably a small amount of maleic anhydride, in order to introduce carboxyl functionality without cross-linking so that the modified resin can be dispersed in water with the aid of a base.

While maleic anhydride is preferred, other unsaturated polycarboxylic anhydrides noted hereinbefore as well as other anhydrides which are not unsaturated can be used. These other anhydrides are illustrated by phthalic anhydride and trimellitic anhydride, the latter being especially useful.

The acid number required for dispersibility in water and to enable electrocoating may vary considerably from about 40 to about 300. On the other hand, these figures are not precise since one must employ sufficient acidity to enable dispersion in aqueous alkaline medium and there are numerous variables, such as the base which is selected, the proportion of its use, the molecular weight of the polymer and the proportion of elastomer included therein. For preferred operation, it has been found that acid numbers of from about 50 to about 200 give best results.

Referring more particularly to the sulfhydryl-terminated polymers which may be included by reaction either with maleic unsaturation in the bis-maleimide or in the acidic side chain, the reaction conditions for this reaction are generally the same as those required for reaction with the diamine (the mixture is cooked at elevated temperature in the liquid phase) and it is to be noted that the sulfhydryl-terminated polymer may be reacted with the bis-maleimide either before reaction with diamine, or after reaction with diamine and prior to further reaction with maleic anhydride, or after reaction with maleic anhydride has been carried out to introduce acidic side chains in the polymer. Irrespective of which procedure is used, the sulfhydryl-terminated polymer is chemically coupled to the polyimide through unsaturation in the polymer and the coupled entity is deposited by undirectional electrical current employed in the electroplating process.

The sulfhydryl-terminated polymers which are used are low molecular weight linear polymers which are preferably elastomers and which have a molecular weight in the range of about 800 to about 4000. Nitrile rubbers, such as copolymers of butadiene and acrylonitrile, are particularly contemplated and it is these which will be illustrated in the accompanying examples. These elastomers are normally provided in the form of emulsion polymers produced by a free-radical polymerization in aqueous emulsion. The sulfhydryl termination can be provided by terminating the polymerization with the addition of hydrogen sulfide or by the addition of a disulfhydryl compound, such as ethylene disulfhydryl, or in any other convenient way.

The polyimide polymers of the invention are particularly desirable because they deposit from aqueous medium, either by electrodeposition or otherwise, adherent films which are extremely hard and solvent resistant and which possess reasonable impact resistance. The inclusion of the sulfhydryl-terminated polymers has been found to add desirable flexibility to the deposited film, and it also importantly improves adhesion to copper. The sulfhydryl-terminated polymers may constitute up to 50% of total resin solids, but preferably provide from 5–25% of resin solids. Curiously, up to about 20% of butadiene-acrylonitrile copolymers may be present without destroying insolubility of the deposited and baked film in relatively strong organic solvents.

The bases which can be used to provide water dispersibility are preferably volatile nitrogenous bases, especially aliphatic amines illustrated by monomethyl amine, dimethyl amine, diethyl amine, triethyl amine and morpholine. Ammonia is also a useful nitrogenous base, but aliphatic amines are preferred.

The resins of this invention may be applied from concentrated water dispersion by spraying or roller coating, but are preferably used in an electrodeposition process in which a unidirectional electrical current is passed through the bath to cause deposition on the anode. For such purpose, the aqueous dispersion is formulated to contain less than about 20% resin solids, preferably 5–15% solids. The pH of the bath can vary widely, e.g., from a pH of 6 or higher up to about pH 10.5. Preferably, the bath pH is between pH 7.5 and 10.4.

The resins used can be applied clear or pigmented and, uniquely, provide good solvent resistance even when used in the absence of any other resin or curing agent and despite baking at only moderate baking temperatures of 400° F. Normally, electrodeposited resins have very poor chemical and physical properties unless these properties are built in via cure after resin deposition. In contrast, the bake in the invention is primarily to remove water amine and any water-miscible solvent which may be present.

The electrocoating baths of the invention may desirably include water miscible organic solvent which may be present in small or large amount as desired so long as the bath is aqueous in nature. These solvents aid bath stability and clarity. The preferred solvents which may be used are the same solvents previously indicated to dissolve the resin. Also there may be present other water miscible solvents such as dioxane, ethanol, isopropanol, 2-ethoxy ethanol, methyl ethyl ketone, 2-ethoxy ethanol acetate, propyl alcohol, butoxy ethanol, 2-ethoxy diethylene glycol, 2-butoxy diethylene glycol, etc.

The invention is illustrated in the following examples.

EXAMPLE 1

A flamed out 500 milliliter reaction flask was fitted with a stirrer, thermometer, condenser, addition port and means for maintaining a nitrogen atmosphere. The flask was charged with 35.5 grams (0.1544 mole) of polyoxypropylene diamine (molecrlar weight 230) and 125 milliliters of dimethyl acetamide (sieve dried and distilled). This mixture was stirred at room temperature for about two minutes to provide a clear colorless solution. At this point 30.3 grams (0.3088 mole) of maleic anhydride were added over a 15 minute period while controlling the exotherm at 55° C. or less. The residual maleic anhydride was rinsed into the flask with 15 milliliters of dimethyl acetamide. After stirring this solution for 15 minutes, it was heated to 150° C. and held there for 2 hours. The solution was then cooled to room temperature and 30.6 grams (0.1544 mole) of methylene dianiline were rinsed into the flask with 10 milliliters of dimethyl acetamide. Following a 10 minute stirring at room temperature, the solution was heated to 150–155° C. and held there for 2 hours. Finally the clear dark yellow-red solution, at 40.4% solids solution, was allowed to cool to room temperature.

A 61.0 gram sample of the above solution was stirred with 5.1 grams of maleic anhydride for 4–5 hours to generate carboxyl groups on the polymer. The carboxyl modified polyimide solution was then precipitated in water and washed twice with distilled water. The yellowish powder was dried in a vacuum oven overnight at 60° C.

An aqueous solution of this polymer may be prepared by adding 12.8 grams of the solid resin to 2.8 milliliters of triethyl amine in 100 milliliters of distilled water. After stirring this mixture for a short period of time a clear yellow-orange solution resulted.

The previously prepared aqueous solution of the polymer could be electrocoated onto an aluminum panel at 100–200 volts for 1 minute. More particularly, using 200 volts for 1 minute a clear film 0.65 mil in thickness is deposited and, following a bake cycle of 5 minutes at 250° F. and 15 minutes at 400° F., a clear, hard, chemically resistant film was obtained. This film easily passed 100 methyl ethyl ketone rubs, 100 N-methyl pyrrolidone rubs and repeated 180° bends of the aluminum panel. The film had a pencil hardness of 5H+.

EXAMPLE 2

This example was prepared in exactly the same manner as Example 1 except that 21.1 grams of methylene dianiline and 3.1 grams of piperazine were mixed together and used in place of the 30.6 grams of methylene dianiline used in Example 1.

After producing carboxyl groups on the polymer via maleic anhydride, an aqueous solution of the material was obtained by dissolving 15.5 grams of the resin in 125 milliliters of distilled water containing 3.4 milliliters of triethyl amine.

This polymer could be electrocoated at 100–200 volts in the same manner as the polymer in Example 1. More particularly, using 100 volts for 1 minute a clear film 0.3 mil in thickness is deposited and following the curing cycle described in Example 1, the same chemical resistance and flexibility of the cured film was obtained. The film had a pencil hardness of 5H+.

The electrodeposited products of Examples 1 and 2 were tested by immersion in aircraft hydraulic fluid (phosphate esters) for 60–90 days and showed no evidence of failure. Also, a 5% salt spray test was satisfactorily resisted for six months.

EXAMPLE 3

This example was performed in the same manner as Example 1 except that 3,9-bis (3-amino propyl) - 2,4,8,10-tetroxaspiro (5,5) undecane was used in place of the polyoxypropylene diamine used in Example 1.

This resin was also electrocoated in the same manner as that of Example 1. Again, the same degree of chemical resistance and flexibility were obtained on the cured panel.

EXAMPLE 4

A 500 milliliter reaction flask was flamed out, placed under a nitrogen blanket, and charged with 34.6 grams (0.150 moles) of polyoxypropylene diamine (molecular weight 230) and 125 milliliters of sieve dried and distilled dimethyl acetamide. This mixture was stirred at room temperature for about two minutes to provide a clear colorless solution. At this point 29.4 grams (0.300 moles) of maleic anhydride were added over a 15 minute period while controlling the exotherm at 55° C. or less. The residual maleic anhydride was rinsed into the flask with 20 milliliters of dimethyl acetamide. After stirring this solution for 15 minutes, it was heated to 150° C. and held there for 2 hours. The solution was then cooled to room temperature.

In the second stage, 22.3 grams (0.1125 moles) of methylene dianiline were rinsed into the flask with 20 milliliters of dimethyl acetamide, heated to 150° C. for 2 hours, then cooled back to room temperature. At this point, 37.5 grams of a sulfhydryl-terminated butadiene-acrylonitrile copolymer [1] were added to the flask with 30 milliliters of dimethyl acetamide. This mixture was heated at 100–120° C. for one hour before cooling back to room temperature.

The production of carboxylic acid groups on the polymer was obtained by adding 10.9 grams of maleic anhydride to 93.2 grams of the resin and stirring for 4–5 hours. A water solution of the acid modified polymer was obtained by adding 10 grams of the dried carboxyl containing polymer to 50 milliliters of distilled water containing 1.4 milliliters of triethyl amine.

The polymer was electrocoated onto an aluminum panel and cured under the same conditions as Example 1. Although this cured film was extremely flexible, it would not withstand 100 rubs with a methyl ethyl ketone saturated cloth.

EXAMPLE 5

Another polymer was prepared in a manner identical to that of Example 4 except that the proportion of elastomer based on total resin solids which was 30% by weight in Example 4 was reduced so that only 13% by weight of the same elastomer was used in this example.

A cured film of the polymer produced with the smaller proportion of elastomer resisted both 100 methyl ethyl ketone rubs and 100 N-methyl pyrrolidone rubs. The film was also extremely flexible.

Some additional characteristics of films formed using the polymers of Examples 1–5 were obtained using films drawn down from dimethyl acetamide solution onto aluminum panels. The panels were cured by first baking for

---

[1] A liquid sulfhydryl-terminated copolymer containing 24% bound acrylonitrile, balance butadiene, having a Brookfield viscosity of 35,000 centipoises at 27° C. and a molecular weight of about 1800.

15 minutes at 250° F. followed by an additional 15 minute bake at 400° F. The results obtained are reported in Table I below:

TABLE I

| Example | Pencil hardness | 85° gloss | Film thickness, mils—0.05 mil | Impact, in./lb. | Acid number |
|---|---|---|---|---|---|
| 1 | 5H+ | 86 | 0.7 | 30 | 80.5 |
| 2 | 5H+ | 97 | 0.7 | 40 | |
| 3 | 5H+ | 92 | 0.5 | 40 | 141.5 |
| 4 | H | 74 | 0.7 | >80 | |
| 5 | 3H | 87 | 0.6 | 70 | |

The invention is defined in the claims which follow.

We claim:

1. A resinous polymer dispersible in water with the aid of a base formed by reacting a bis-maleimide with a diprimary amine in a molar ratio of from 5:1 to 1:5, said diprimary amine being free of reactive groups other than amine groups, and said bis-maleimide having the formula:

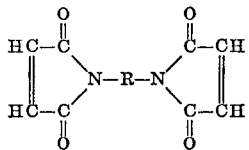

in which R is a divalent organic radical of a diprimary amine of the type recited, said reaction being carried out in solution in polar organic solvent at a temperature of at least about 130° C. to provide a resinous polymer soluble in polar organic solvent and containing secondary amine groups and imide groups and then reacting said resinous polymer soluble in polar organic solvent with a polycarboxylic monoanhydride to consume at least a portion of said secondary amine groups and thereby introduce carboxyl functionality providing an acid number of from about 40 to about 300 and enabling water dispersibility with the aid of a base.

2. A polymer as recited in claim 1 in which the ratio of said bis-maleimide to said diprimary amine is from 1.5:1 to 1:1.5.

3. A polymer as recited in claim 1 in which said bis-maleimide is formed by reacting an alpha,beta-monoethylenically unsaturated monoanhydride with diprimary amine including the oxyalkylene group.

4. A polymer as recited in claim 3 in which said oxyalkylene group is selected from oxyethylene, oxypropylene and oxybutylene groups.

5. A polymer as recited in claim 1 in which said diprimary amine is polyoxypropylene diamine.

6. A polymer as recited in claim 1 in which said reaction is carried out in solution in polar organic solvent at a temperature of about 150° C.

7. A polymer as recited in claim 6 in which said solvent is selected from the group of dimethyl formamide, dimethylacetamide, N-methyl pyrrolidone and butyrolactone.

8. A polymer as recited in claim 2 in which said bis-maleimide is formed by reaction of 1 mole of diprimary amine including the oxyalkylene group with 2 moles of maleic anhydride.

9. A polymer as recited in claim 8 in which said bis-maleimide is reacted with an aliphatic diprimary amine.

10. A polymer as recited in claim 1 having an acid number of from about 50 to about 200.

References Cited

UNITED STATES PATENTS 2,818,405   12/1957   Kovacic _____ 260—78

HAROLD D. ANDERSON, Primary Examiner

U.S. Cl. X.R.

117—93, 161 P, 161 UN; 260—29.2 N, 29.6 HN, 30.2, 30.4 N, 32.2, 32.6 N, 32.8 N, 33.4 R, 47 CZ, 47 CP, 78 SC, 78 TF, 887